A. C. BOLTON.
MACHINE FOR MANUFACTURING HOSE.
APPLICATION FILED NOV. 29, 1910.

1,028,067.

Patented May 28, 1912.
9 SHEETS—SHEET 1.

WITNESSES:
G. V. Rasmussen
John A. Kellenbeck

INVENTOR
Andrew C. Bolton
BY Otto J. Schrenk
Bieser & Knauth
ATTORNEYS

A. C. BOLTON.
MACHINE FOR MANUFACTURING HOSE.
APPLICATION FILED NOV. 29, 1910.

1,028,067.

Patented May 28, 1912.
9 SHEETS—SHEET 2.

A. C. BOLTON.
MACHINE FOR MANUFACTURING HOSE.
APPLICATION FILED NOV. 29, 1910.

1,028,067.

Patented May 28, 1912.

WITNESSES:

INVENTOR
Andrew C. Bolton
BY
ATTORNEYS

A. C. BOLTON.
MACHINE FOR MANUFACTURING HOSE.
APPLICATION FILED NOV. 29, 1910.

1,028,067.

Patented May 28, 1912.

UNITED STATES PATENT OFFICE.

ANDREW C. BOLTON, OF NEW YORK, N. Y., ASSIGNOR TO THE GUTTA PERCHA & RUBBER MANUFACTURING CO., OF NEW YORK, N. Y., A CORPORATION OF NEW YORK.

MACHINE FOR MANUFACTURING HOSE.

1,028,067.      Specification of Letters Patent.      Patented May 28, 1912.

Application filed November 29, 1910. Serial No. 594,631.

*To all whom it may concern:*

Be it known that I, ANDREW C. BOLTON, a citizen of the United States, and resident of the borough of Brooklyn, county of Kings, city and State of New York, have invented certain new and useful Improvements in Machines for Manufacturing Hose, of which the following is a specification.

My invention relates to the manufacture of what is commonly known as rubber hose which usually comprises a foundation tube of rubber or similar material and one or more outside wrappers of rubber or impregnated fabric which up to now have usually been combined into a single structure by hand on a mandrel and then vulcanized. Owing to the fact that only a given length of mandrel, the maximum being about fifty feet, could be conveniently and profitably manipulated hose made in this way was limited to fifty foot lengths or less and if a greater length was desired it became necessary to connect two or more lengths to secure the desired result.

The particular object of the invention is to do away with this hand manipulation and limit in the length of hose which may be produced and to provide a machine which does away with the necessity for a mandrel and will automatically and effectively apply the outside wrappers to a tubular foundation of any desired length either more or less than the customary fifty feet.

My invention will be fully described hereinafter and the features of novelty will be pointed out in the appended claims.

Reference is to be had to the accompanying drawings in which—

Figs. 2 and 3 together show a complete elevation thereof; Fig. 2 being partly in section; Fig. 16 is a detail view of one of the wrapping rollers; Fig. 20 is a sectional view in the line 20—20 of Fig. 19.

Figure 1:
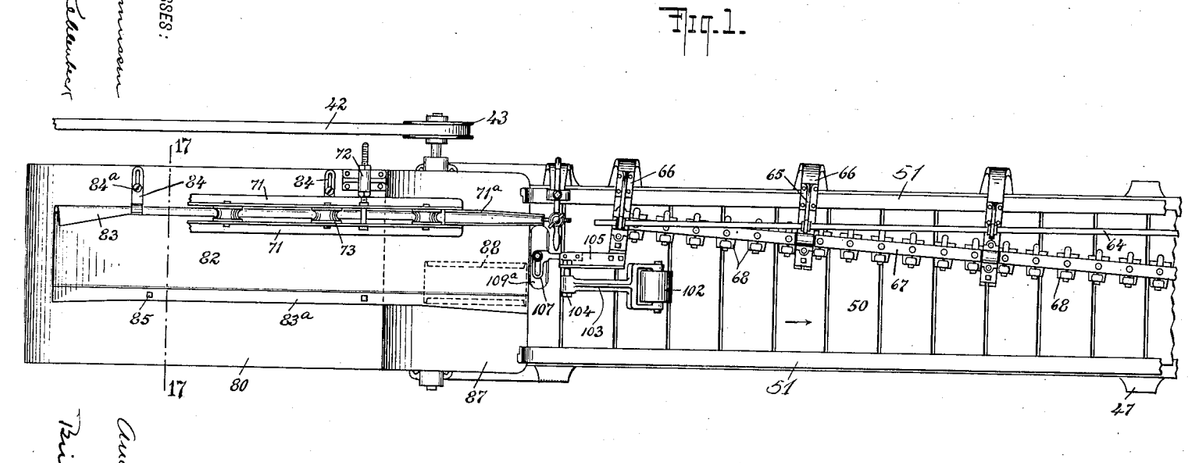
Figures 1 and 1ª together represent a plan view of my improved complete machine.
Figures 1A, 1B:
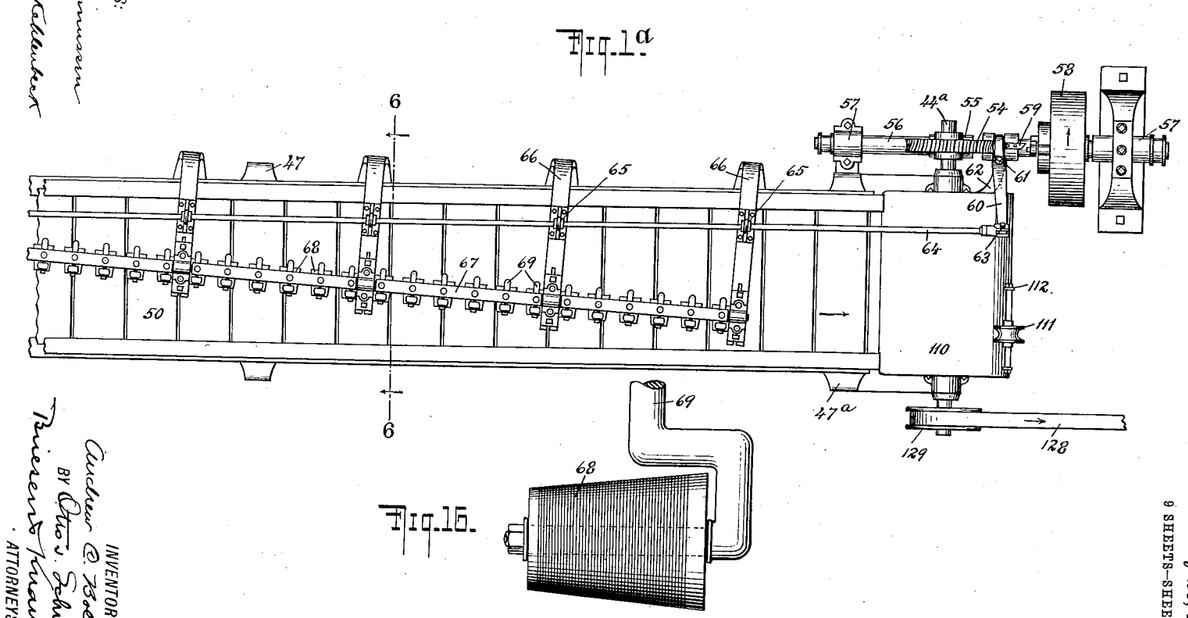
Figure 2:
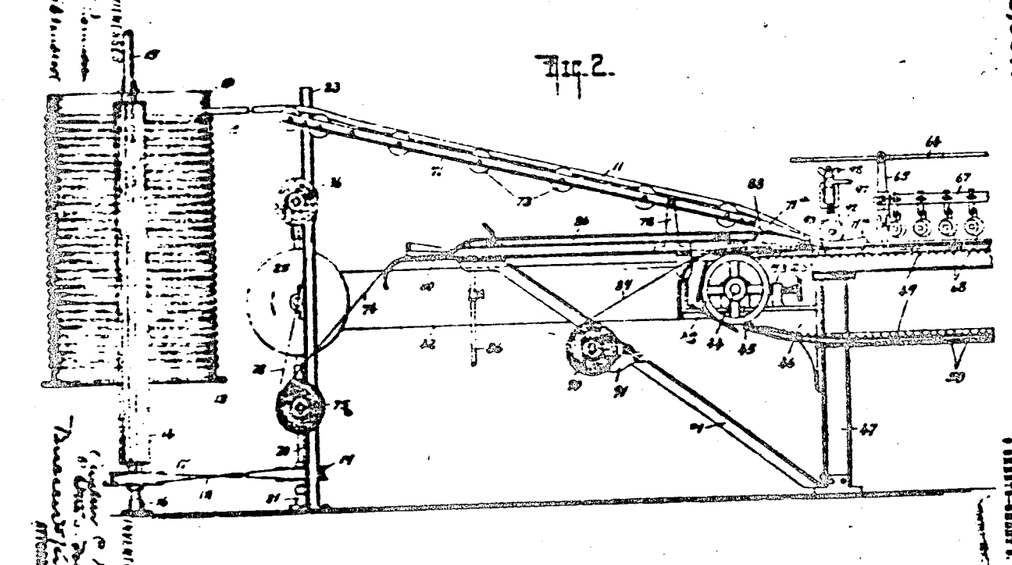
Figure 3:
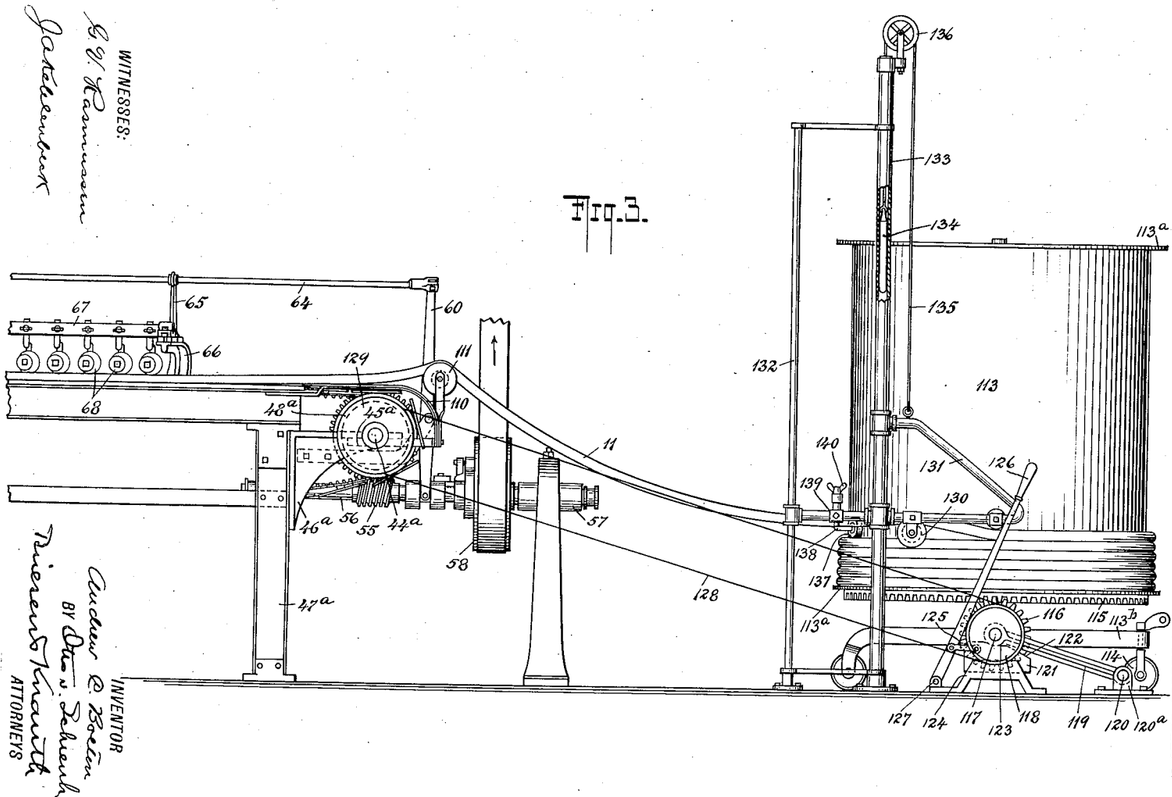
Figures 4, 5:
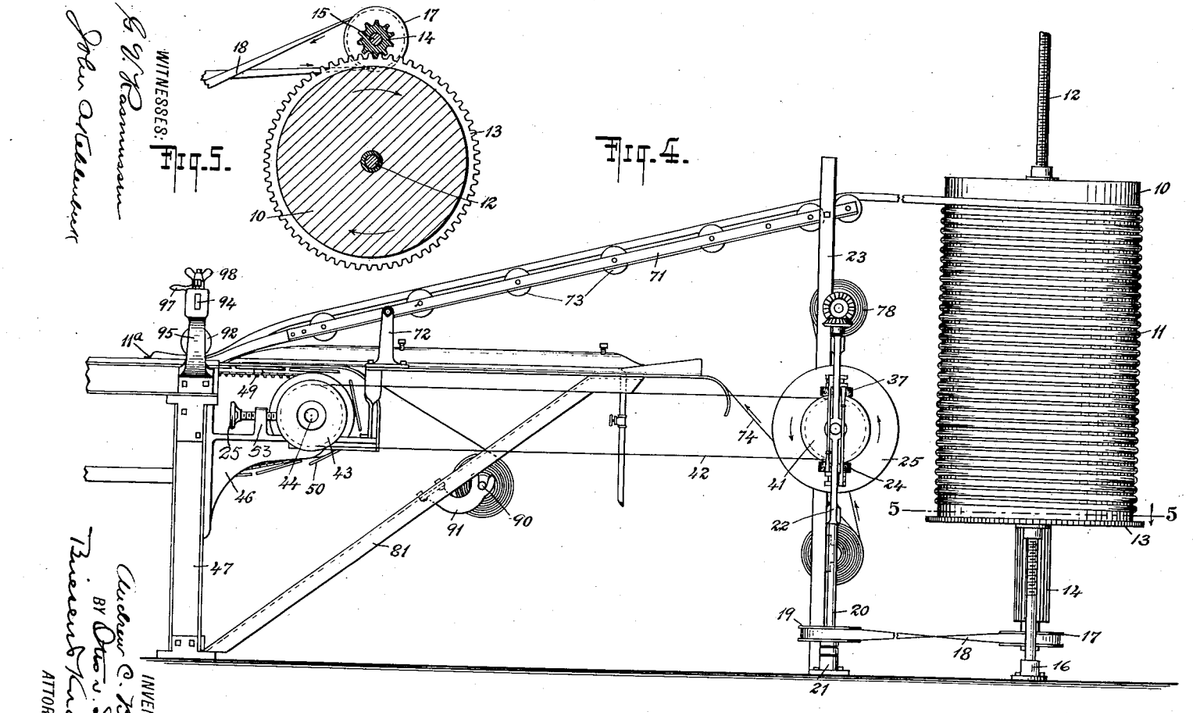
Fig. 4 a view similar to Fig. 2 looking from the opposite side.
Fig. 5 is a detail horizontal section on the line 5—5 of Fig. 4.
Figure 6:
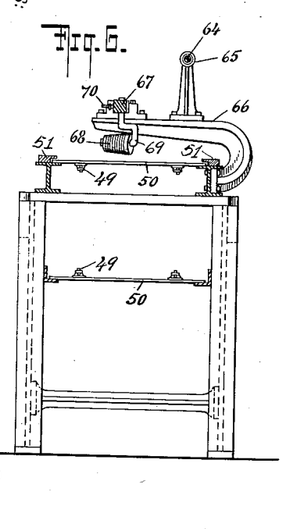
Fig. 6 is a cross section on the line 6—6 of Fig. 1ª.
Figure 7:
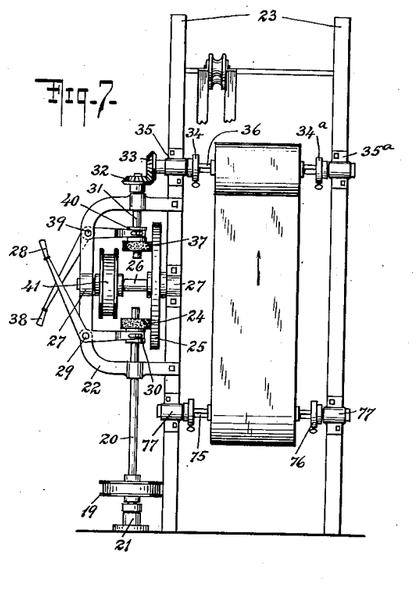
Fig. 7 is an end elevation.

In the first form of my machine 10 represents a drum on which the foundation tube 11 of rubber or similar material is carried, the said drum being preferably provided with a spiral groove for the more ready accommodation of said tube. This tube 11 which may be of any desired length is first closed at one end as indicated at 11ª and inflated to expand the same and give it a certain amount of body after which its opposite end is sealed to retain the air or other inflating medium therein, in which condition it is wound upon the drum 10. The drum 10 is rotatably mounted on an upright screw threaded post 12 and is provided at its lower portion with a toothed flange or gear 13 which meshes with an elongated pinion 14 shown best in Fig. 2. The pinion 14 is carried by an upright shaft 15 arranged parallel with the post 12 and journaled in stationary bearings or sockets 16. A belt pulley 17 is located on the shaft 15 and is connected by means of a belt 18 with a similar pulley 19 secured to a shaft 20 journaled in a socket 21 and bracket 22 mounted on a frame 23. The shaft 20 carries a friction wheel 24 at its upper end which friction wheel engages and coöperates with a friction disk 25 secured to a horizontal shaft 26 journaled in bearings 27 on the bracket 22 and frame 23 respectively. The friction wheel 24 is held to rotate with the shaft 20 by a spline or key but is slidable lengthwise thereof by means of a hand lever 28 pivoted at 29 on the bracket 22 and having a pin and slot engagement at 30 with a collar forming part of or secured to said wheel 24. A second upright shaft 31 is journaled on the upper portion of the bracket 22 and carries a bevel pinion 32 which meshes with a similar bevel pinion 33 located on a short shaft 34 rotatably mounted in a bearing 35 on the frame 23. A similar short shaft 34ª is similarly mounted in a bearing 35ª on the opposite member of said frame 23, said shafts being in axial alinement and arranged to removably receive the opposite ends of a preferably square shaft 36 the purpose of which will be more fully described hereinafter. A friction wheel 37 is mounted on the shaft 31 so as to be rotatable therewith but slidable lengthwise thereof and engages and coöperates with the friction disk 25. A hand lever 38 is pivoted at 39 on the bracket 22 and is connected by means of a pin and slot connection 40 with a collar forming part of or secured to said friction wheel 37 and serves to shift said friction wheel in the same manner as the wheel 24 is shifted by the lever 28. A pulley wheel 41 is located on the shaft 26 and is connected by means of a belt 42 with a similar belt pulley 43 carried by a shaft 44 journaled in bearings 45 secured to brackets 46 mounted on standards 47. The said shaft 44 also carries spaced sprocket wheels 48 for the accommodation of sprocket wheels 48$^a$ secured on a shaft 44$^a$ and located at a distance from said shaft 44 and journaled in bearings 45$^a$ similar to the standards 47. Plates 50 are pivotally secured to the sprocket chains 49 with their adjacent edges in close proximity to form a continuous traveling conveyer or platform. The said plates bridge the lateral space between the parallel chains 49 and project at each side beyond the same into stationary guides 51 which extend from one set of standards 47 to the other set 47$^a$ and are supported thereby, additional standards 47$^b$ being supplied at intermediate points if desired. Adjusting screws 25 mounted in stationary lugs 53 are preferably provided for the purpose of adjusting the tension of the sprocket chains 49 and the conveyer formed of the plates 50. A worm wheel 54 is carried by the shaft 44$^a$ and meshes with a worm gear 55 located on a counter shaft 56 journaled in stationary bearings 57. A power pulley 58 is loosely mounted on said shaft 56 and is arranged to be coupled therewith through the medium of a clutch 59 slidably mounted on said shaft and connected with a lever 60 pivoted at 61 on a stationary projection 62 secured to the bracket 46$^a$. The lever 60 is pivotally connected at 63 with an operating rod 64 which extends lengthwise of the machine and is slidably mounted in bearings 65 located on brackets 66 mounted on the one guide 51. This operating rod is readily accessible from all points along said machine which is thus under the control of the attendant at all times. The brackets 66 extend over the guides 51 and traveling conveyer 50 gradually increasing in length from the receiving to the delivery end of the machine and serve as a support for a rail 67 which owing to the gradually increasing length of said brackets thus extends at an angle to the path of the conveyer 50. Tapered or conical rollers 68 are journaled on studs 69 which are carried by the rail 67 so as to be vertically adjustable, thumb screws 70 being provided for maintaining said studs and rollers in their adjusted positions. These rollers 68 preferably have their surfaces milled or otherwise roughened and are arranged at short intervals, the series extending substantially throughout the entire length of the traveling conveyer 50. The purpose of these rollers will appear more clearly from the description hereinafter.

Figure 8:
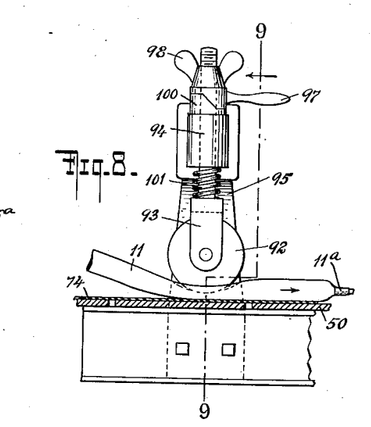
Fig. 8 is a view of the pressure roller.
Figure 9:
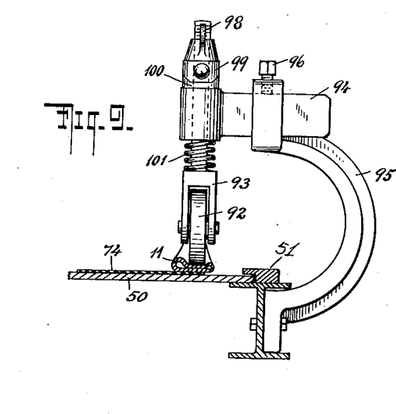
Fig. 9 is a sectional view thereof on the line 9—9 of Fig. 8.
Figures 10, 11, 12, 13, 14:
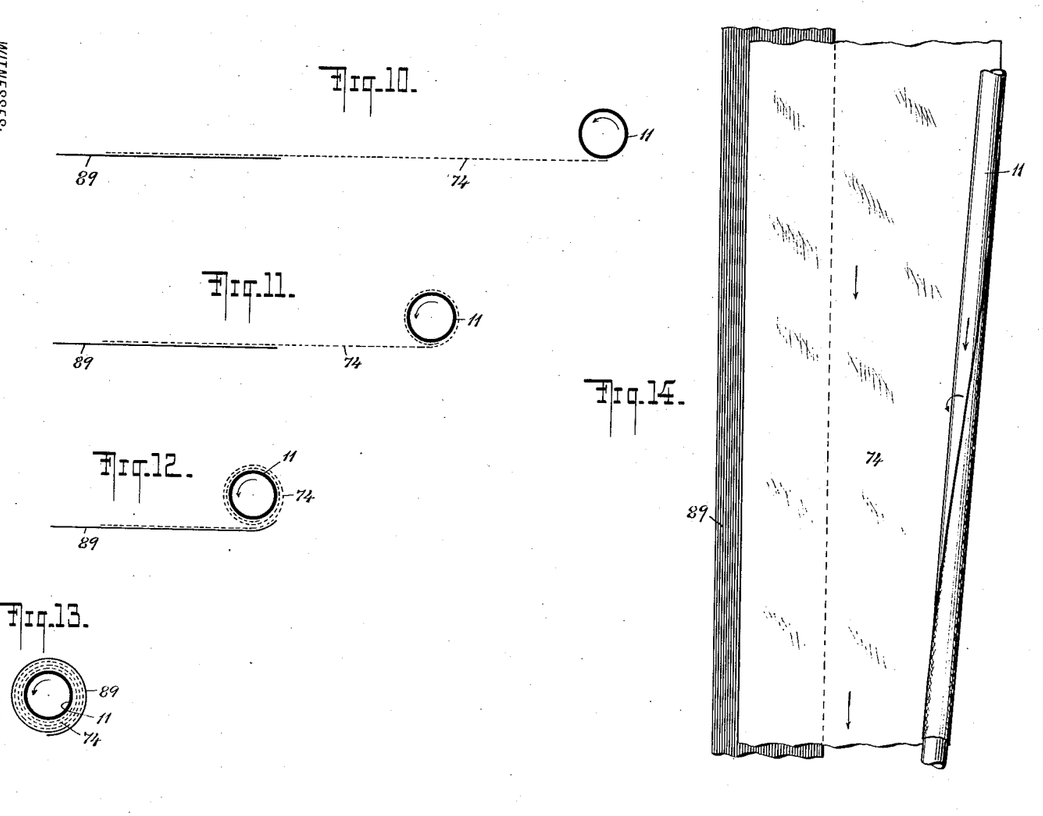
Figs. 10, 11, 12 and 13 are diagrammatic cross sectional views showing the wrapping operation in its successive steps.
Fig. 14 is a plan view of a section of the hose and wrapper or coverings.
Figure 15:
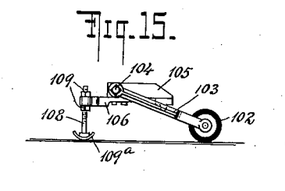
Fig. 15 a detail view of a friction roller.
Figure 17:
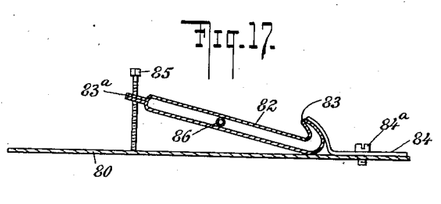
Fig. 17 is a detail cross section in the line 17—17 of Fig. 1.
Figures 18, 19:
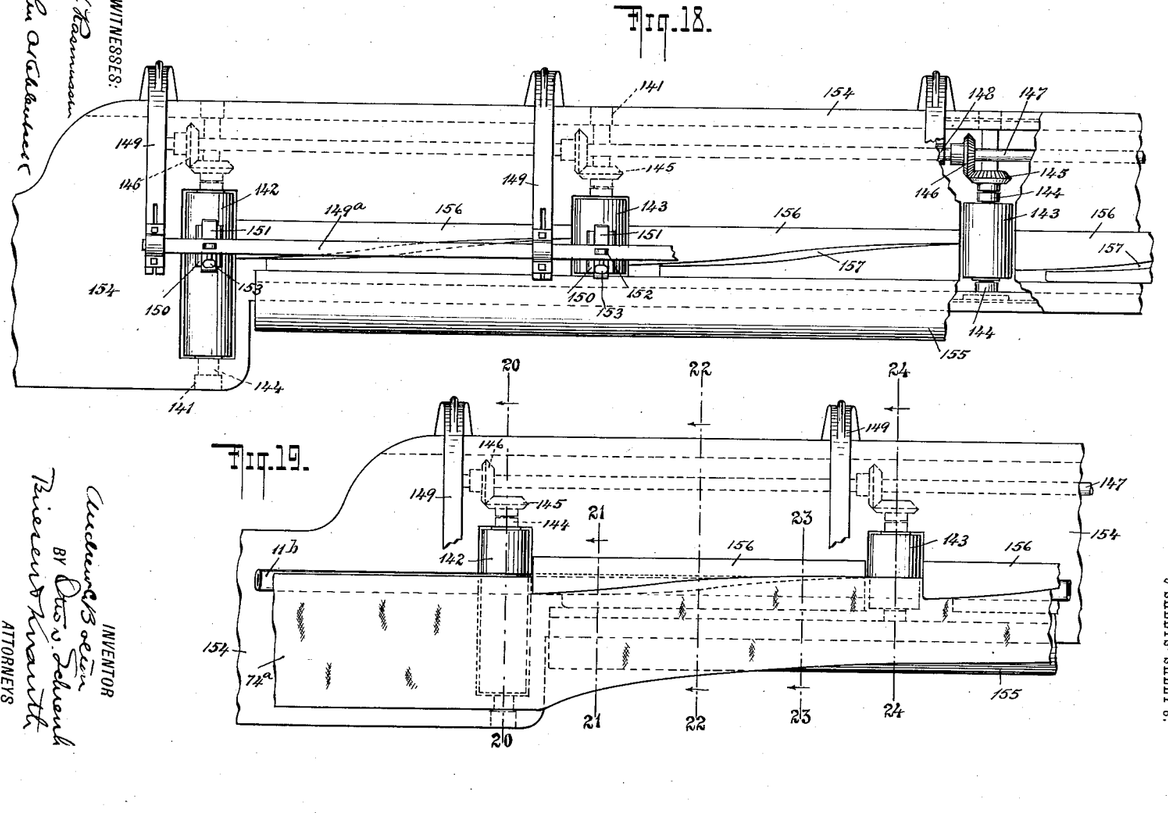
Fig. 18 is a plan view of a portion of another form of machine.
Fig. 19 is a similar view thereof with the material in position.

Spaced rails 71 have their one end each secured to the frame 23 and are supported adjacent to their opposite ends by means of stationary standards 72 so as to be inclined downwardly toward the traveling conveyer. Grooved rollers 73 are journaled between said rails 71 at spaced intervals and serve as supports to guide the tube 11 from the drum 10 to the traveling conveyer 50. A trough 71$^a$ extends from the lower ends of the rails 71 to the conveyer 50. The impregnated fabric 74 which forms one of the outer coverings may be of any suitable description and is carried in rolls on a shaft 75 which may be removably connected with short shafts 76 journaled in bearings 77 secured to the frame 23 below the shafts 34 and 34$^a$ and bearings 35 and 35$^a$. As the impregnated fabric 74 is gummy or tacky and inclined to stick together a cloth cover 78 is applied thereto and rolled up therewith so that said cover is located between the different convolutions of the impregnated fabric 74. As the said fabric 74 is delivered to the machine the cloth cover 78 is rolled upon the shaft 36 which as before stated is adapted to be removably connected with the shafts 34 and 34$^a$. A table 80 is mounted adjacent to the receiving end of the conveyer 50 with its end preferably spaced therefrom and is supported by means of braces 81. Spaced parallel plates 82 connected to form a closed chamber have their one edge bent over to form a hollow flange 83 and are secured to slotted lugs 84 arranged to be adjustably connected with the table 80 by means of set screws 84$^a$. The opposite edges of said plates 82 are connected to form a closed flange 83$^a$ through which screw-threaded bolts 85 pass at intervals. The lower ends of said bolts 85 loosely engage the top of the table 80 and by being rotated serve to adjust the lateral inclinations of the plates 82 as clearly shown in Fig. 17. The said plates 82 extend lengthwise of the table 80 and bridge the space between the end of the said table 80 and the conveyer 50. A pipe 86 communicates with the interior of the chamber formed by the plates 82 and serves to conduct steam or other heating medium thereto under certain conditions as will appear more fully from the description hereinafter. The plates 82 serve as a support for the impregnated fabric 74 in its passage from the roll to the traveling conveyor, the end of the table 80 nearest to the drum 10 being curved downwardly so as to avoid tearing or injuring of said fabric as it travels. A second table 87 is located in the same plane with the table 80 in the space between the inner end thereof and the conveyer 50 and has its one end bent downwardly over the sprocket 48, chains 49 and plates 50 as clearly shown in Fig. 2. This second table 87 is provided at the proper place on its upper surface with a guide 88 for guiding the extreme outer rubber cover 89 from its roll to the conveyer 50. It will be seen from an inspection of Fig. 2 of the drawings that the said rubber cover 89 is carried in a roll on a shaft 90 which is removably and rotatably supported in the forked ends of the lugs 91 secured to the braces 81. A pressure roller 92 is journaled in the forked end of a rod 93 mounted to move in a vertical direction in a slide 94 which in turn is mounted to slide horizontally in a stationary support 95, a set screw 96 being provided for maintaining said slide 94 in its adjusted position. A handle 97 is adjustably connected with the rod 93 and is secured in its adjusted position by means of a thumb screw 98 said handle being provided with a cam 99 adapted to coöperate with a fixed cam 100 on the slide 94 to raise and lower the roller 92. A coil spring 101 surrounds the rod 93 and has its one end in engagement with the slide 94 and its other end contacting with the forked end of the rod and tends to exert a downward pressure so as to press the roller 92 toward the conveyer. Thus the pressure of said roller 92 may be adjusted by moving the thumb screw 98 after which the roller may be raised or lowered by simply manipulating the handle 97. The said roller 92 is located immediately in front of the free end of the trough 71ª and serves to press the tube 11 upon the fabric 74 which owing to the tacky condition of said fabric will cause the same to stick to and become united with said tube. The operation of this part of the machine is illustrated best in Figs. 8 and 9. A friction roller 102 is journaled in a fork 103 pivotally mounted at 104 on a support 105 extending from one of the brackets 66 and normally rests upon the conveyer in a direct line with the guide 88. An arm 106 is secured to the support 105 and is provided with a slotted portion 107 extending substantially at right angles to the path of the conveyer 50. An upright screw-threaded post 108 projects through the slotted portion 107 and is maintained in position through the medium of lock nuts 109. This post 108 carries at its lower end what might be termed a presser foot 109ª which is curved in cross section and extends into close proximity to the conveyer 50. The roller 102 by its weights serves to unite the fabric 74 and cover 89 in the same manner as the tube 11 and fabric 74 are united by means of the roller 92 while the presser foot 109ª engages said fabric 74 and rubber cover 89 in advance of the roller 102 and prevents wrinkling thereof as the said fabric and cover travel along.

At its delivery end the machine is provided with a shield or plate 110 rigidly secured in position adjacent to the delivery end of the conveyer and extending over the sprocket wheels 48ª, chains 49 and plates 50 at this end of the machine. The finished hose in its travel from the conveyer 50 passes over this plate 110 and over a roller 111 journaled in bearings 112 secured to said plate 110. From the roller 111 the finished hose passes to a receiving drum 113 rotatably mounted on a carriage 113ᵇ having rollers 114. The drum is provided at its lower portion with a circular rack 115 which is arranged to be moved into mesh or engagement with a pinion 116 carried by a shaft 117. The shaft 117 also carries a belt pulley 118 and is journaled in the end of a lever 119 pivotally mounted at 120 in a stationary bearing 120ª. The free end of the lever 119 rests upon a slide 121 having an inclined surface 122 and a straight surface 123 and slidably mounted in a stationary support 124. The slide 121 is pivotally connected by means of a link 125 with an operating hand lever 126 pivoted at 127 on a portion of the support 124. Thus by operating the hand lever 126 the slide 121 is actuated and through the medium of the inclined face 122 and straight face 123 raises or lowers the pinion 116 into or out of engagement with the circular rack 115. The belt pulley 118 is connected by means of a belt 128 with a pulley 129 on the shaft 44ª through the medium of which the pinion 116 is operated and the drum 112 rotated to wind up the finished hose. Before the said hose reaches the drum 112 it passes over a grooved pulley 130 journaled on a carrier 131 vertically movable on stationary posts 132 and 133. The post 133 is made hollow or tubular for the accommodation of a counter weight 134 connected with the carrier 131 by means of a cord 135 or the like, which cord travels over a pulley 136 journaled at the upper portion of the post 133. A roller 137 is rotatably mounted on a support 138 secured in a collar 139 located on the carrier 131 said support being adjustable in said collar and secured in position by means of a wing nut 140. Thus as the finished hose is wound upon the drum 112 as it rotates the carrier 131 will gradually rise as each succeeding coil of the hose is wound on the drum and the roller 137 will firmly press the convolution or coil into close engagement with the next preceding one. The finished hose is by this means evenly and closely wound upon the drum in close coils, flanges 112ª at the top and bottom thereof respectively serving to maintain the coils in position.

In operation the end of the outside rubber covering 89 is drawn over the end of the table 87 and through the guide 88 and its end brought upon the conveyer 50 and under the friction roller 102. The impregnated fabric 74 is now brought over the table 80 and uppermost plate 82 the one edge thereof being located in the recess formed by the flange 83 and drawn along until its end is also over the conveyer 50 and under the roller 102 the weights of which serve to unite said covering 89 and fabric 74. In this condition the one edge of the fabric 74 is also located under the pressure roller 92. While the impregnated fabric is thus being positioned the cloth 78 will also be unwound and after the fabric 74 is in place as described is wound upon the shaft 79. It will be seen by referring to Fig. 14 that the rubber covering 89 is below the impregnated fabric 74 and extends slightly beyond the one edge thereof, and further that the said rubber covering is relatively narrower than the impregnated fabric 74. After the two covers 74 and 89 have been placed in position as just described the inflated tube 11 which is to be wrapped, is drawn down over the rollers 73 through the trough 71ª and its closed end brought under the pressure roller 92 which has been previously raised to make this easily possible. The handle 97 is now actuated to lower the roller 92 into engagement with the tube 11 which is composed or flattened, owing to the tension of the spring 101, into the condition shown best in Fig. 9 and firmly united with the tacky impregnated fabric 74. The machine is now ready to be started which is accomplished by moving the rod 64 to the left in Fig. 1ª and swinging the lever 60 to bring the clutch 59 into operative engagement with the pulley 58 which receives power from any suitable source. This causes a rotation of the shaft 56 and worm gear 55 and consequently actuates the worm wheel 54 and with it the shaft 44ª thereby rotating the sprocket wheels 48ª and causing the sprocket chains 49 and conveyer 50 to travel along. The direction of motion is such as to drive the upper run of the conveyer 50 toward the delivery end of the machine, that is to the right in Figs. 1 and 1ª. Owing to the pressure exerted on the tube and the two covers 74 and 89 by the rollers 92 and 102 these two covers as well as the tube are maintained in close frictional engagement with the upper run of the conveyer and carried along as the conveyer travels. It is to be understood that the tube 11 resumes its normal shape immediately after leaving or passing from under the roller 92. The end of the tube 11 will thus finally reach the first roller 68 and will be deflected thereby from a straight course to a course at an angle to the direction in which the conveyer travels. This is due to the fact that the axis of the first roller 68 as well as the axes of the remaining rollers are arranged at right angles to the carrying bar 67 which extends at an angle to the direction in which the conveyer travels. As the tube 11 is thus deflected it is also given a rotary movement by the roller 74 the tube tending to ride up on the inclined roughened surface of said roller as it were but being continually pressed toward the enlarged end of said roller by the continued forward travel of the upper run of the conveyer. In other words the portion of the tube nearest to the conveyer that is its lower edge is subjected to a pressure in a direction parallel with the direction in which the conveyer travels. This pressure owing to the fact that the axis of the tube at the point where it engages the roller 68 extends at an angle across the said direction of travel tends to rotate said tube. This rotary movement of the tube is accentuated by the conical shape and roughened surface of the roller 68 as the tube as before stated tends to ride up on the inclined surface but is prevented from doing so to any extent by the pressure of the conveyer exerted in the direction of travel thereof, which pressure maintains said tube substantially adjacent to the enlarged end of the roller. As the tube is rotated as described it carries the cover 74 of impregnated fabric 74 along with it and winds this fabric upon itself spirally. A continued operation of the machine will convey the tube 11 to the next roller 68 and so on always rotating said tube a little farther and winding up the fabric 74 the rollers 68 each meanwhile rotating about its own axis. As the impregnated fabric 74 owing to its tacky condition has also become connected with the outer rubber cover 89 this cover will also be finally carried around and wound spirally upon the cover 74 to form an outer covering. The successive stages of this winding or wrapping operation are clearly shown in Figs. 10, 11, 12 and 13, Fig. 13 showing the completed hose in cross-section. The fabric cover 74 is preferably so proportioned that is of such a width as to form several layers around said tube while the rubber cover 89 is relatively narrow and so located and proportioned as to form preferably only a single outer envelop or covering. The number of plys or layers may be increased or diminished at will on a machine of given length adjusting the axes of the rollers 68 relatively to the conveyer 50, or in other words by swinging said rollers about the axes of the various studs 69, to increase or diminish the angle of the spiral winding. Or if desired the supporting rail 67 may be adjustably mounted so as to be capable of swinging in a horizontal plane in which case the rollers 68 are all adjusted simultaneously and individual adjustment thereof within certain limits is unnecessary. With these adjustments the width of the fabric 74 may be constant, the difference in the number of layers being secured by changing the angle at which said fabric is wrapped. With these two methods the number of rollers 68 also remains the same. In addition to the above the number of plys or layers of fabric may be varied by increasing or reducing the number of rollers 68 and changing the width of the fabric 74 accordingly as more or less plys are desired. The presser foot 109ª keeps the covers in a flat unwrinkled condition and is adjustable lengthwise of the slotted portion 107. The tube leaves the last roller 68 fully covered and finished and the end thereof is carried along by an attendant over the rollers 111 and 130 and attached in any suitable manner to the drum 113. This drum 113 having meanwhile been operatively connected with the pinion 116 is rotated through the medium of the belt 128 and pulleys 118 and 129 in a direction to automatically wind the finished tube upon itself after the end has been secured as described. The first coil of the finished tube rests upon the lower flange 113ª and the roller 137 travels upon said coil and presses it down firmly as the drum rotates. As each succeeding coil is wound upon the drum the roller 137 presses it down and the carrier 131 rises a step aided by the counter weight 134 and also by the roller 137 which travels along said coils. The finished hose is thus deposited on said drum 113 in firm, even coils or convolutions until the drum is filled after which the hose is cut and the cut end secured in place and the drum with the hose thereon moved into the vulcanizing chamber.

As the tube is drawn along and wrapped as described and the machine operated rotary movement will be transmitted to the friction disk 25 through the medium of the belt 42 and pulleys 41 and 43. This rotation of the friction disk 25 will also cause the rotation of the friction wheel 24 and shaft 20 and through the medium of the belt 18 and pulleys 17 and 19 will actuate the elongated gear 14, which in turn will transmit its motion to the gear wheel 13 and drum 12. This movement of the drum 12 is in a direction to unwind the tube 11 and as the screw threaded rod 12 is stationary also causes said drum to travel upwardly thereon. The pitch of the thread of the rod 12 is such as to always maintain the upper coil of the tube 11 at substantially the same level as the uppermost guide roller 73 so that unnecessary bending and kinking of the tube is avoided, it being understood that the gear 14 is of such a length as to always remain in engagement with the gear wheel 13 throughout the drum's vertical movement. The speed of rotation of the drum 10 may be regulated to suit the requirements of each operation by shifting the friction wheel 25 across the face of the friction disk 24 through the medium of the hand lever 28. During the above operation of the friction disk 24 as described the friction wheel 37 will also be actuated thereby and will in turn rotate the shaft 31 and bevel gear 32 which will transmit its motion to the bevel gear 35 and shaft 34 and cause the shaft 36 to be revolved in a direction to take up the cloth cover 78 as the impregnated fabric 74 is unwound. The speed at which said shaft 36 is revolved may be regulated to correspond to the speed at which the fabric 74 is unwound by shifting the friction roller 37 across the face of the disk 25 through the medium of the operating lever 38.

In cool weather or when the temperature is lowered through artificial means the impregnated fabric 74 sometimes becomes hard and loses its tackiness in which case steam or other heating medium is introduced into the chamber formed by the plates 82 through the pipe 86. These plates are thus heated and soften and heat the fabric 74 in its passage to the conveyer. The said plates 82 are horizontally adjustable so that the groove formed by the flange 83 is always in line with the circumferential center of the pressure roller 92. The said plates are inclined so that the one edge of the fabric 74 will automatically always travel in the groove above referred to and thus always be delivered directly under the roller 92. The degree of inclination may be adjusted to secure the best and desired results by rotating the bolts 85. When the normal temperature is sufficiently high the steam or other heating medium may be shut off.

The rollers 68 in addition to being made conical for the purposes hereinbefore described are also thus made to readily accommodate tubes of different diameters. For hose of extraordinarily large or small diameter the rollers may be vertically adjusted by simply loosening the thumb screws 70 and positioning said rollers as desired and then again tightening up said screws 70.

It will be readily seen that with this form of my improved machine the use of a mandrel is unnecessary and the wrappers, that is the fabric 74 and covering 89, are wound spirally upon the foundation tube so that a hose of any desired length or diameter may be quickly and automatically manufactured.

Figures 21, 22, 23, 24, 25:
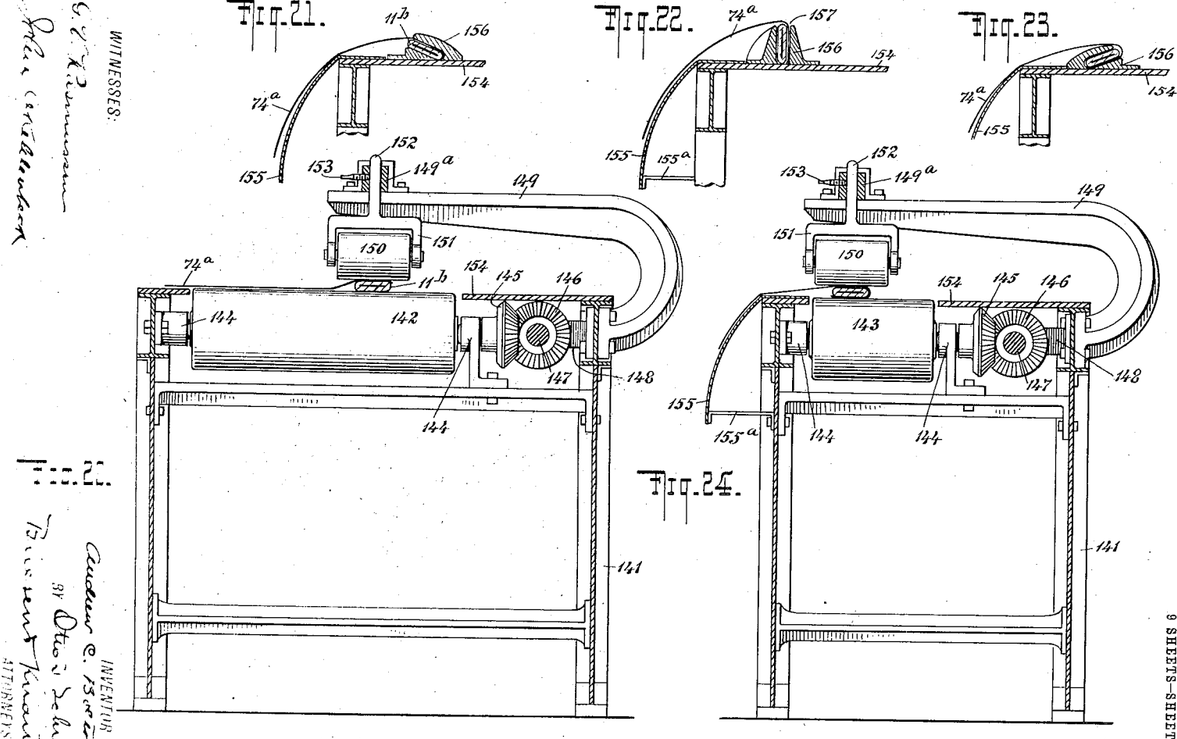
Figs. 21, 22 and 23 are detail sections taken respectively on the lines 21—21, 22—22 and 23—23 of Fig. 19
Fig. 24 is a section on the line 24—24 of Fig. 19.

In the second form of my improved machine 141 represents a stationary supporting frame on which feed rollers 142 and 143 are journaled at spaced intervals in bearings 144. The shaft of each of these rollers carries a bevel pinion 145 arranged to mesh with similar pinions 146 located on a shaft 147 extending at right angles to the axes of the rollers 142 and 143 and journaled in stationary bearings 148 secured to the frame 141. Power is applied to the shaft 147 in any suitable manner as by a belt and pulley so that the rollers 142 and 143 will be uniformly driven thereby. Arms 149 similar to the arms 66 of the first form of my machine are carried by the frame at intervals and extend over the rollers 142 and 143 as shown in Figs. 20 and 24 to serve as supports for the bar 149$^a$ which corresponds to the bar 67. Continued pressure and feed rollers 150 are journaled in supports 151 having stems 152 each of which extends through apertures in the bar 149$^a$ which is located directly over the rollers 142 and 143. The rollers 150 are vertically adjustable to secure the desired amount of pressure and are maintained in their adjusted positions by means of set screws 153. A table 154 is secured to the upper portion of the frame 141 at about the level of the upper portions of the rollers 142 and 143, said table being cut out at the points where the rollers 142 and 143 are located. The said table 154 further extends beyond the frame 141 at one side and is bent downwardly preferably in a curve as indicated at 155 to form a support for the cover as will be more clearly brought out hereinafter its free edges being supported at intervals by braces 155$^a$. Between the roller 141 and the first roller 142 and between each pair of rollers 142 and 143 is located a twisting die 156 having a spiral groove 157 extending lengthwise thereof. This groove 157 at its entrance end is substantially horizontal and open to the left as shown in Fig. 21 and then in a gradual sweep assumes a more inclined position until finally the said groove is open toward the top and extends vertically as shown in Fig. 22. From this point the angle of inclination of said groove becomes again gradually less until it assumes the position shown in Fig. 23 and finally at its delivery end becomes again substantially horizontal but open to the right. These grooves are thus in the nature of twist grooves the entrance end of the first one of which being adjacent to the first roller 150 and the delivery end in close proximity to the next roller 150 on one side while the entrance end of the next groove is adjacent to the same roller 150 on the opposite side and the delivery end thereof in close proximity to the next succeeding roller 150 and so on. It will thus be seen that the delivery ends and receiving or entrance ends of each pair of adjacent grooves are opposed to each other with a roller 150 between them. It will be noted in this form of my improved machine that the combined pressure and feed rollers are cylindrical instead of tapered and are arranged with their axes parallel with the axes of the feed rollers 142 and 143 and that the arms 149$^a$ extends in a direction parallel to the direction in which the rollers 142 and 143 feed instead of at an angle as in the first form of my machine. Furthermore in this last form of my invention the tube 11$^b$ is not inflated as is the tube 11 of the first form of my machine.

This second form of my invention operates as follows: The one end portion of the tube 11$^b$ is first laid on the table 154 after which the end portion of the tacky fabric 74$^a$ corresponding to the fabric 74 is brought over said tube and the one edge thereof pressed down on the tube 11$^b$ either by hand or through the medium of a pressure roll similar to the roll 92 until said fabric has become attached to said tube. The end of the tube 11$^b$ either by hand or through the medium of a pressure roll similar to the roll 92 until said fabric has become attached to said tube. The end of the tube 11$^b$ with the fabric 74$^a$ secured thereto is now passed between the first roller 150 and the roller 142. It will be seen from an inspection of Fig. 20 that the roller 142 is of an axial length to support the fabric 74$^a$ which extends only slightly beyond said roller, the projecting portion being supported on the table 154. It being understood that the driving mechanism has now been started to rotate the various rollers the combined tube and fabric will be fed between the rollers 150 and 142, into the receiving end of the spiral or twist groove 157. Continued operation of the mechanism will feed this tube 11$^b$ and fabric 74$^a$ through the said groove 157 in the first twisting die 156 in a direction toward the second roller 150 and first roller 143. During its passage through this first groove 157 the tube has been gradually twisted about its own axis owing to the formation of said groove until said tube has been given a half revolution about its own axis and wrapped a portion of the fabric 74$^a$ upon itself. The successive steps in this wrapping operation are clearly shown in Figs. 21, 22 and 23. From the second roller 150 and first roller 143 the tube with a portion of the fabric 74$^a$ wrapped thereon is passed to the second twisting die 156 and given another half turn, or in other words, a complete revolution about its own axis to wrap another portion of said fabric 74$^a$ upon itself. This feeding and twisting operation continues until finally the end portion of the hose is completely wrapped in superposed layers of fabric 74$^a$ after which it may be delivered to a receiving drum in the same way as in the first form of my machine. It is to be understood that as soon as the fabric leaves the roller 142 the free portion thereof hangs down on the curved portion 155 of the table 154, the weight of this hanging or depending portion serving to exert a certain amount of tension on the fabric which will thus be evenly and smoothly wrapped about the tube. The walls of the groove 157 which are gradually spaced farther apart as the delivery end of the machine is reached so that the groove 157 gradually becomes wider to accommodate the gradually increasing width of the hose as it nears completing also serves to exert a smoothing action on said fabric. It is to be further understood that the wrapping operation is continuous and that in each succeeding twisting die 156 the wrapping is substantially a step farther advanced than in the next preceding die 156. As the tube nears the delivery end of the machine the free portion of the fabric 76a is gradually drawn into the grooves of the dies 156 until finally the said fabric is completely wrapped about said tube. Some time before this happens an outer covering 89a similar to the covering 89 is attached to the fabric 74a either by hand or in the same manner as described with regard to the first form of my structure so that this outer covering is also finally wrapped upon the tube or rather upon the fabric 74a. Any number of plies or layers of fabric may be wrapped on the tube 11b by simply increasing or diminishing the number of twisting dies 156 and varying the width of the fabric accordingly. As the combined fabric and tube pass between the various pairs of rollers the said tube and fabric are periodically subjected to the pressure of the rollers 150 so that a perfect junction between the tube and fabric and between successive layers of fabric is secured. After the desired length of hose has been wrapped or manufactured it may be expanded to air or other pressure to its normal shape and then vulcanized. During its passage through the machine the tube is more or less flattened as shown. With this form of machine the tube is wrapped longitudinally and not spirally although this is not essential as this last form of my invention may with slight change in the position of the parts be operated to apply the wrappers spirally if desired. The rollers 143 and 150 in addition to pushing the tube and fabric into the receiving end of one groove 157 also serve to pull said tube and fabric through the next preceding groove and thus exert a double action to insure a perfect feed through all the grooves. In this form as in my first form I may then manufacture and wrap hose of any desired length and with any number of layers or plies of wrapping or covering, the same adjustment of the various parts being the same as in the first form.

In both forms of my invention soap stone, or other powder or lubricant is preferably blown into the foundation tubes so as to prevent opposing surfaces thereof from sticking together as the various pressure rollers exert pressure on said tubes as hereinbefore described.

Various changes in the specific construction shown and described may be made within the scope of the claims without departing from the spirit of my invention.

I claim:

1. In a machine for manufacturing hose, a common supporting means for an inflated foundation tube and an unapplied covering therefor, said supporting means being arranged exteriorly of said foundation tube, and mechanism for moving said tube to apply said covering thereto.

2. In a machine for manufacturing hose, a common supporting means for an inflated foundation tube and an unapplied covering therefor, said supporting means being arranged exteriorly of said foundation tube, and mechanism for rotating said tube about its own axis to apply the covering thereto.

3. In a machine for manufacturing hose, means for longitudinally feeding a foundation tube and an unapplied covering therefor, and means for moving said tube relatively to the feeding movement to apply said wrapper thereto.

4. In a machine for manufacturing hose, means for longitudinally feeding a foundation tube and an unapplied covering therefor, and means for rotating said tube about its own axis during its longitudinal feed to apply the covering thereto.

5. In a machine for manufacturing hose, a common supporting means for a foundation tube and an unapplied covering therefor, and means for moving said tube longitudinally and rotatably to spirally wrap said covering about said tube.

6. In a machine for manufacturing hose, a traveling carrier for moving a foundation tube and a covering therefor in the direction of their length and means for causing a movement of said tube relatively to said carrier to combine the cover with the tube.

7. In a machine for manufacturing hose, a traveling carrier for moving a foundation tube and a covering therefor in the direction of their length and means for diverting the tube from its course and causing a rotation thereof to spirally wrap the cover about the tube.

8. In a machine for manufacturing hose, a traveling carrier for moving a foundation tube and a tacky covering therefor in the direction of their length, means for exerting a pressure on said tube and covering to cause them to unite and means for causing a movement of said tube relatively to the carrier to apply a covering to the tube.

9. In a machine for manufacturing hose a traveling carrier for a foundation tube, a tacky covering and an outer covering therefor, means for uniting said tube and tacky covering, separate means for uniting said tacky covering and said outer covering and means for causing a movement of said tube relatively to said carrier to apply both coverings to the tube.

10. In a machine for manufacturing hose, a rotatable support for a foundation tube, a traveling carrier for said tube and an unapplied covering therefor, means coöperating with said carrier for combining said tube and covering and mechanism for operating said carrier and rotating said support to deliver the tube to said carrier.

11. In a machine for manufacturing hose, a traveling carrier for a foundation tube and an unapplied covering, means coöperating with said carrier for combining said tube and covering, a rotatable support for said tube located adjacent to the receiving end of said carrier and arranged to deliver the tube thereto, a rotatable receiver adjacent to the delivery end of said carrier arranged to receive the finished hose and mechanism for operating said carrier, said support and said receiver.

12. In a machine for manufacturing hose, means for combining a foundation tube and a covering therefor and a chambered stationary support adapted to contain a heating medium over which said covering is adapted to travel before it is combined with the tube.

13. In a machine for manufacturing hose, means for combining a foundation tube and a covering therefor and a chambered stationary support over which said covering is adapted to travel before it is combined with the tube and a connection for introducing a heating medium into said chambered support.

14. In a machine for manufacturing hose, a traveling carrier for a foundation tube and a covering therefor and means arranged in a plane parallel with said carrier but at an angle to the path thereof and adapted to coöperate with said carrier to combine the tube and covering.

15. In a machine for manufacturing hose, a carrier for a foundation tube and a covering therefor arranged to travel in a horizontal plane, and a series of rollers arranged above said carrier at an angle to the path thereof and adapted to coöperate with said carrier to combine the tube and covering.

16. In a machine for manufacturing hose, means for linearly moving a foundation tube and a covering therefor and means for gradually converting said linear motion of the tube and covering into motion about the axis of the tube to combine the tube and covering.

17. In a machine for manufacturing hose, means for linearly moving a foundation tube and a covering therefor, means for uniting said tube and covering and means for causing said tube to change its direction of travel and be rotated about its axis to spirally wind said covering upon the tube.

18. In a machine for manufacturing hose, a common supporting means for a traveling foundation tube and an unapplied covering therefor, and mechanism for moving said tube to apply said covering thereto.

19. In a machine for manufacturing hose, a common supporting means for a traveling foundation tube and an unapplied covering therefor, and mechanism for rotating said tube about its own axis to apply the covering thereto.

In testimony whereof, I have hereunto set my hand in the presence of two subscribing witnesses.

ANDREW C. BOLTON.

Witnesses:
 JOHN A. KEHLENBECK,
 M. H. LOCKWOOD.